US012512573B1

(12) United States Patent
Lu

(10) Patent No.: US 12,512,573 B1
(45) Date of Patent: Dec. 30, 2025

(54) SYSTEM AND METHOD FOR EFFICIENTLY GENERATING ELECTROMAGNETIC WAVES WITH REDUCED VELOCITIES

(71) Applicant: Weimin Lu, Novi, MI (US)

(72) Inventor: Weimin Lu, Novi, MI (US)

(73) Assignee: Weimin Lu, Novi, MI (US)

( * ) Notice: Subject to any disclaimer, the term of this patent is extended or adjusted under 35 U.S.C. 154(b) by 0 days.

(21) Appl. No.: 19/208,804

(22) Filed: May 15, 2025

Related U.S. Application Data

(60) Provisional application No. 63/683,374, filed on Aug. 15, 2024.

(51) Int. Cl.
*H01P 3/06* (2006.01)
*H01Q 21/06* (2006.01)

(52) U.S. Cl.
CPC ............... *H01P 3/06* (2013.01); *H01Q 21/06* (2013.01)

(58) Field of Classification Search
CPC .................................. H01P 3/06; H01Q 21/06
See application file for complete search history.

(56) References Cited

U.S. PATENT DOCUMENTS 8,208,191 B2 6/2012 Gan et al.
8,482,478 B2 7/2013 Hartenstein
9,472,838 B2 10/2016 McKinzie, III
11,296,804 B2 4/2022 Chopra et al.
2006/0280407 A1 12/2006 Montgomery et al.

FOREIGN PATENT DOCUMENTS

WO WO-2019002752 A1 * 1/2019 ............. H01Q 21/10

OTHER PUBLICATIONS

Carol L. Kory, "Validation of an Accurate Three-Dimensional Helical Slow-Wave Circuit Model", NASA Contractor Report 4766, Contract NAS3, Mar. 1997.

* cited by examiner

*Primary Examiner* — Andrea Lindgren Baltzell
*Assistant Examiner* — Kimberly E Glenn
(74) *Attorney, Agent, or Firm* — Carrier, Shende & Associates P.C.; Joseph P. Carrier; Fulchand P. Shende

(57) ABSTRACT

A system for efficiently generating or originating a tailored electromagnetic (EM) wave having a lower velocity than the speed of electromagnetic waves in free space includes a coaxial waveguide which extends linearly and a sinewave current generator. The coaxial waveguide includes a tubular outer body and a tailored emitting antenna disposed coaxially within the tubular outer body. The tubular outer body is formed of a first conductive material and defines a space therein which may be maintained as vacuum. The tailored emitting antenna is constructed physically and electrically by at least three phase-shifted sub-antennas connected in series, each of the sub-antennas being formed of a second conductive material which is less conductive than the first conductive material. The sinewave current generator generates multiple phase-shifted sinewave currents which are respectively input to the sub-antennas.

19 Claims, 4 Drawing Sheets

SYSTEM AND METHOD FOR EFFICIENTLY GENERATING ELECTROMAGNETIC WAVES WITH REDUCED VELOCITIES

CROSS REFERENCE TO RELATED APPLICATIONS

The present application claims priority from U.S. Provisional Patent Application 63/683,374, filed Aug. 15, 2024. The entire disclosure of this prior application is incorporated herein by reference.

FIELD OF THE INVENTION

The present invention pertains to a system and method for efficiently generating or originating tailored electromagnetic (EM) waves having lower velocities than the speed of EM waves in free space (the speed of light), which EM waves having the lower velocities can be advantageously used in many applications. More particularly, the present invention pertains to such a system and method in which the tailored EM waves are originated within a coaxial waveguide in which a vacuum may be maintained as the dielectric medium and the EM waves propagate linearly along the axis of the waveguide, such that there is no dielectric EM energy loss due to vacuum and no directional EM energy loss due to the axial propagation.

BACKGROUND ART

Slow phase velocity of EM waves in radio wave frequency range from 3 KHz to 300 GHz, or slow EM waves, have wide range applications. For example, use of slow EM waves makes is possible to reduce sizes for high-performance resonators and filters in RF and microwave communication systems. Slow EM waves can improve the resolution of radar systems by increasing the interaction time. Slow EM waves can increase energy dissipation and enhances electromagnetic shielding or stealth capabilities. Slow EM waves can improve resolution and penetration depth in medical imaging systems. Slow EM waves can improve the sensitivity and accuracy of diagnostic tools in plasma behavior. Slow EM waves can enhance sensitivity in microwave-based quantum sensors for detecting magnetic or electric fields. Slow EM waves enable microwave heating more uniform and efficiently in processing of materials like ceramics, polymers, or food.

As known, an oscillating sinewave current on a conductor produces an oscillating electric field which further produces an oscillating magnetic field which in turn becomes a new source of electric field. Hence, an electromagnetic (EM) wave is generated on the conductor and propagated in a dielectric medium such as air, vacuum, insulating materials, etc. The directions of an oscillating electric field and an oscillating magnetic field are perpendicular to each other, and a propagating direction of the EM wave is perpendicular to both electric and magnetic fields. Every dielectric medium, including air and vacuum, has a velocity of EM wave, called "phase velocity" that is a constant and independent to the wavelength of an EM wave. In free space, phase velocity of an EM wave is equal to the speed of light. All other dielectric media have smaller phase velocity than speed of light.

Currently there are four known methods for slowing down phase velocity of an EM wave in radio wave range or microwave range, which excludes light which is a type of EM wave) inside a waveguide. The first known method is conventional and uses special dielectric medium or metamaterial inside the waveguide. A disadvantage to this known method is dielectric medium loss of the energy of the slowed EM wave. The slower the phase velocity is, the higher the loss of EM energy is. Because photons of the EM wave have to collide with dielectric material and give up some energy, the greater the density of the dielectric medium, the higher the dielectric loss of the EM energy is. The second known method uses helical or spiral propagation, rather than axial propagation of an EM wave inside a waveguide. A disadvantage of this known method is directional energy loss. Because the direction of energy flux, also known as "Poynting vector", of the EM wave is not in the axial direction of the waveguide, only partial electromagnetic (EM) energy propagates. The third known method uses a combination of both metamaterial medium and helical propagation for greater reduction of phase velocity, but at the expense of a greater EM energy loss. The forth known method uses multiple conductive obstacles inside a waveguide to slow down EM wave propagations at even greater EM energy loss. All four of the known methods involve electromagnetic (EM) energy loss. A few specific examples based on the known methods are as follows.

U.S. Pat. No. 11,296,804, B2 to Chopra et al. discloses phased array antennas in a circular arrangement with multiple frequencies.

U.S. Pat. No. 9,472,838, B2 to McKinzie III discloses phased array of conductive obstacles inside a waveguide to slow down EM waves.

U.S. Pat. No. 8,482,478 B2 to Abraham Hartenstein discloses an antenna array in circular housing configuration where multiple antennas are connected to a single signal source.

U.S. Pat. No. 8,208,191 B2 to Gan et al. discloses a series different grading structure to slow down light (EM wave) in propagation through the structure.

US Patent Application Pub. No. 2006/0280407A1 to Montgomery et al. discloses a spiral resonant waveguide to slow light (EM wave) in propagation.

NASA 1997 Contactor Report 4766 by Carol L. Kory titled "*Validation of An Accurate Three-Dimensional Helical Slow-Wave Circuit Model*" discloses a helical structure to slow down microwave propagations.

Each of these prior arts involve use of at least one of the known methods for slowing down phase velocity of an EM wave inside a waveguide while sacrificing some of the energy of an EM wave, again, because they involve use of dense metamaterial media as the dielectric media in which the EM wave travels, which metamaterials interact with photons of the EM wave or they involve use of spiral Poynting vector (direction of energy flux) or they involve use of obstacles to slow down the phase velocity of an EM wave inside a waveguide at expenses of the energy of an EM wave.

Thus, a need still exists in the art for a system and method which can more effectively and efficiently generate EM waves having lower velocities than the speed of EM waves in free space without incurring significant EM energy loss.

SUMMARY OF INVENTION

An object of the present invention is to satisfy the discussed need.

The present invention creates a new system and method to dramatically slow down the phase velocity of an EM wave inside a coaxial waveguide without dielectric medium energy loss and without directional energy loss. The present invention is able to achieve this objective because it uses vacuum as the dielectric medium inside the waveguide and the direction of energy flux is generated in the axial direction of the waveguide.

According to a first aspect of the present invention, a tailored slow EM wave is originated and propagated within a coaxial waveguide. Such coaxial waveguide may include a tubular outer conductor and a tailored emitting antenna shaped as a long, straight/linear rod disposed inside and along the axis of the waveguide, and constructed of multiple phase-shifted sub-antennas connected physically and electrically in series. Every sub-antenna may be identical and in shape of a short piece of straight rod made of relatively low conductive material, like chromium, titanium so that each sub-antenna can have voltage potential difference due to some electrical resistance of the material. All sub-antennas are physically and electrically connected in series collectively forming the long straight rod as the tailored antenna so that electric current can carry through the antenna from a beginning point to an ending point of the tailored antenna. Further the system of the present invention may include a unique, multiple phase-shifted sinewave current generator that is electrically connected to all of the sub-antennas by feed lines. The feed lines may be connected between the current generator and the sub-antennas from a side of the waveguide or, if the antenna is hollowed rod, from a center of tailored antenna.

According to a second aspect of the present invention, the sub-antennas get sinewave currents in phase-shifted sequences from the multiple phase-shifted sinewave current generator so that the tailored antenna collectively forms the tailored EM wave within the coaxial waveguide. In vacuum, an effective velocity of the tailored EM wave is the traveling or propagating speed of the tailored EM wave. A physical distance on the tailored antenna between two of the sub-antennas with same phase defines an effective wavelength of the tailored EM wave, and is thus based on the linear length of the sub-antennas with same phase. The effective wavelength may be selected by design and is independent to the frequency and the effective velocity of the tailored EM wave. Some electrical resistance of the sub-antenna permits and builds up voltage potential difference between adjacent sub-antennas. The effective velocity is slower than the speed of EM waves in free space.

According to a third aspect of the present invention, the tailored EM wave exists in near field within a coaxial waveguide configuration similar to a common coaxial cable. The coaxial waveguide has the tailored antenna extending along its center axis and carries sinewave current from a beginning point of the antenna to an ending point where an end load is connected. The tailored antenna is constructed physically and electrically by multiple sub-antennas in series, where each of the sub-antennas produces a section of the tailored EM wave. An electric field is generated radially towards and perpendicular to the outer conductor of the coaxial waveguide and a magnetic field is generated circularly around and perpendicular to the tailored antenna. And these electric field and magnetic field are generated by alternative sinewave current on the tailored antenna, which results in the EM wave that axially propagates within the waveguide towards the end load. Because the direction of propagation or Poynting vector (direction of energy flux) is always orthogonal to both electric field and magnetic field, the direction of propagation of the EM wave is in the axial direction of the waveguide. Therefore there is no directional EM energy loss in the tailored EM wave inside the waveguide, as well as no dielectric EM energy loss in vacuum.

According to a fourth aspect of the present invention, according to another embodiment, a tailored antenna is constructed in a circumference of the waveguide, while an internal conductor is disposed inward of the tailored antenna along a central axis of the waveguide.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DETAILED DESCRIPTION OF THE PRESENT ILLUSTRATIVE EMBODIMENTS

Figure 1:
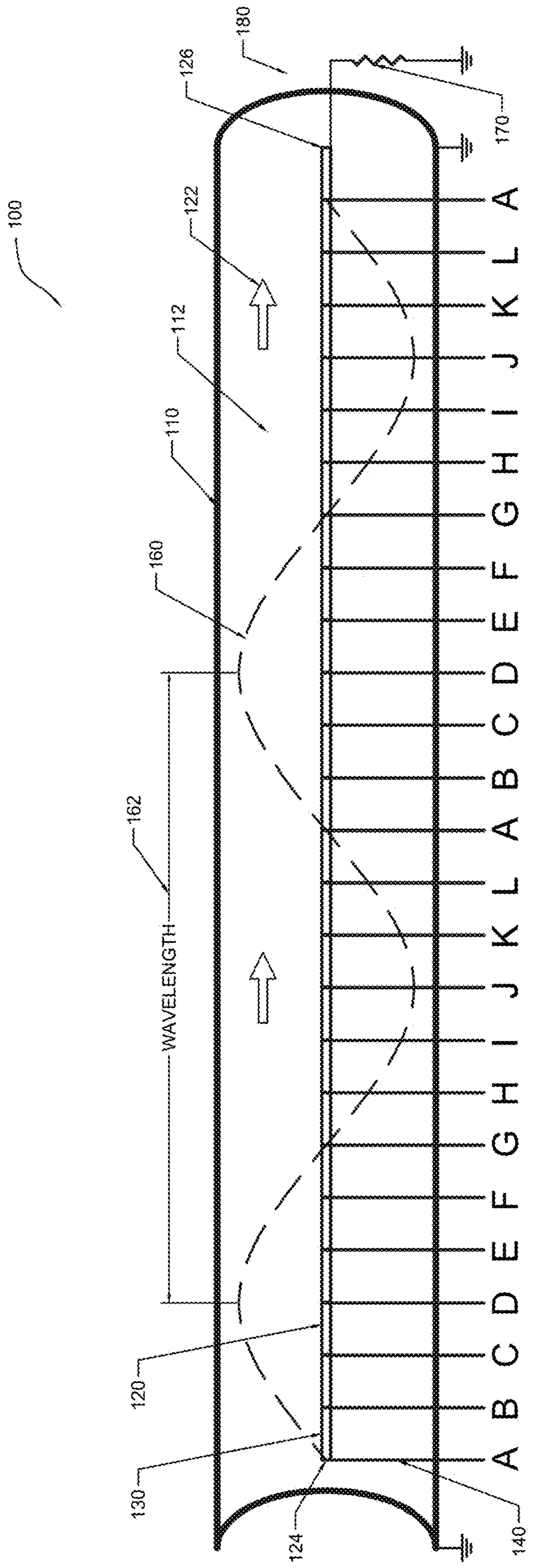
FIG. 1 is a side, sectional view of an exemplary embodiment of a coaxial waveguide according to the present invention and a tailored electromagnetic (EM) wave within the waveguide.

A number of selected illustrative embodiments of a coaxial waveguide and an illustrative embodiment of a multiple phase-shifted sinewave current generator that together with the coaxial waveguide collectively constitute a system according to the present invention for efficiently generating or originating tailored electromagnetic (EM) waves having lower velocities than the speed of EM waves in free space, as well as a corresponding method for efficiently generating or originating the tailored EM waves according to the present invention, will now be described in some detail with reference to the drawings. It should be understood that only structures considered necessary for a person of ordinary skill in the art to have a clear understanding of the present invention are described herein. Other conventional structures that may be used as parts of or together with the disclosed embodiments, and those of ancillary and auxiliary components of the system according to the present invention are known and understood by those skilled in the art. For example, all non-electrical structures that support a tailored antenna 120 inside a waveguide 100 in the first exemplary embodiment of the present invention are omitted to simplify the illustration.

Terminology Used Herein

EM wave: Electromagnetic wave.

Antenna: An antenna referred in present invention is an emitting antenna that converts an alternating electric current into EM wave.

Free Space: Free space is a region where there is perfect vacuum, no matter, no electromagnetic field, no charged particles and a reference point for physics.

Dielectric medium: Dielectric medium is a medium material which an EM wave travels or propagates through. Dielectric medium include vacuum, air, most dielectric insulation materials, metamaterials, etc. When the dielectric medium is a vacuum, the present invention will clearly state this. Vacuum is different from free space.

Frequency of EM wave: Frequency is a scalar number that refers to the number of alternating cycles per second of an electromagnetic (EM) wave.

Wavelength of EM wave: Wavelength is the distance between two points of the same phase on an EM wave.

Effective wavelength of EM wave: An effective wavelength of the EM wave refers to the wavelength of a tailored EM wave in present invention.

Speed (velocity) of EM wave in free space: The speed of EM wave in free space equals to the speed of light (c) in free space which is $3\times10^8$ m/s.

Phase velocity of EM wave: Phase velocity is a vector number that refers to traveling or propagating speed of an EM wave in a confined dielectric medium.

Effective velocity of EM wave: Effective velocity is a vector number that refers to traveling or propagating speed of a tailored EM wave in a dielectric medium in present invention.

Slow wave (or slow EM wave or slow light): Slow wave refers the phase velocity of an EM wave (or light) in a confined medium, which velocity is slower than the speed of light.

First Illustrative Embodiment

Figure 2:
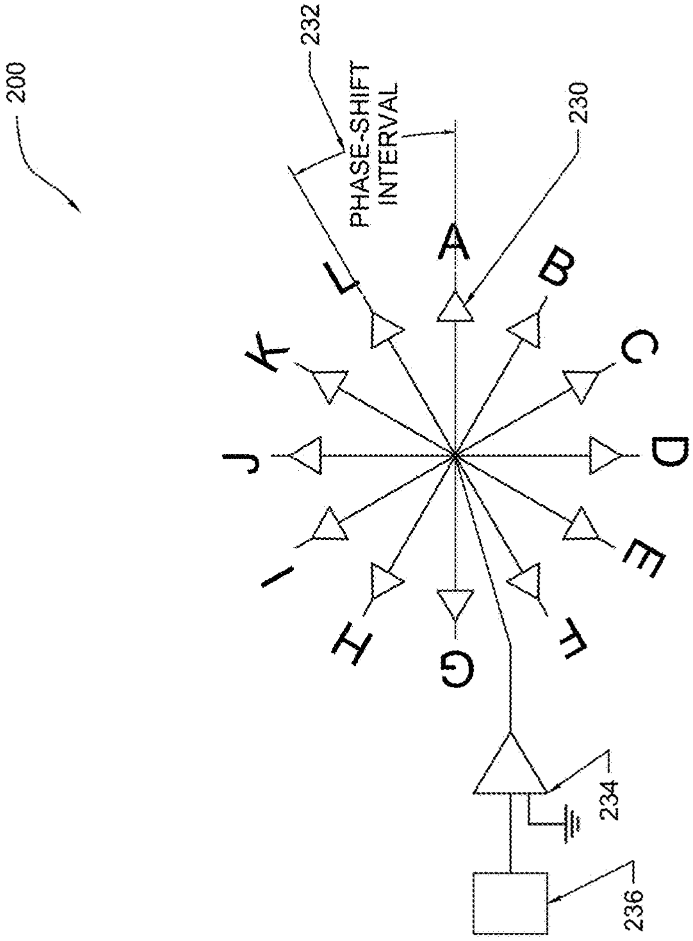
FIG. 2 is a schematic view of an exemplary embodiment of a logic circuit diagram of a multiple phase-shifted sinewave current generator according to the present invention, which generator functions together with the coaxial waveguide of FIG. 1 to generate the tailored EM wave.

A coaxial waveguide 100 depicted in FIG. 1 and a multiple phase-shifted sinewave current generator 200 depicted in FIG. 2 jointly constitute a system according to a first exemplary embodiment of the present invention.

Referring to FIG. 1, there is shown a side, sectional view of an exemplary embodiment of a coaxial waveguide 100 and a tailored emitting antenna 120 disposed within the waveguide 100, which are two of three main parts of a system according to the present invention for efficiently generating or originating tailored EM waves having lower velocities than the speed of EM waves in free space. FIG. 1 also shows in broken lines a tailored EM wave 160 which originates within the waveguide.

As depicted, the coaxial waveguide 100 may be an open or closed, tubular member, which may be maintained in vacuum 112, while outside the waveguide 100 is free space 180. An outer circumference or wall 110 of the waveguide 100 may be a conductor made of highly conductive material, like copper, aluminum, etc., with a cross-sectional shape of round tube, square tube, etc. Herein, such conductor made of highly conductive material will be referred to as "first conductor".

The tailored emitting antenna 120 may be disposed within the waveguide 100 such that it extends along a central axis of the waveguide and may be shaped as an elongate straight rod functioning as a center conductor of the coaxial waveguide 100. According to an important aspect of the present invention, the emitting antenna 120 may be constructed electrically and mechanically using three or more phase-shifted sub-antennas 130 connected in series. The depicted emitting antenna 120 includes twenty five (25) sub-antennas 130 in total, with twelve (12) of the sub-antennas 130 in one cycle of the originated EM wave 160. Every sub-antenna 130 may be identical and in the shape of a short piece of straight rod made of relatively low conductive material, like chromium, titanium, etc. Herein, such low conductive material will be referred to as "second conductor". By being formed of such relatively low conductive materials, each sub-antenna 130 can have voltage potential difference due to some electrical resistance of the material. All of the sub-antennas 130 are physically and electrically connected in series, and collectively form a long straight rod in series as the tailored emitting antenna 120 that can carry electric current of the originated EM wave from a beginning point or first end 124 to an ending point or opposite end 126 of the antenna.

Referring to FIG. 2, the third main part of the system according to the present invention for efficiently generating or originating tailored EM waves having lower velocities than the speed of EM waves in free space may be a unique sinewave current generator 200 which generates multiple phase-shifted sinewave currents and respectively inputs such phase-shifted sinewave currents to the sub-antennas 130. The sub-antennas may be electrically connected to the sinewave current generator by respective side feed lines 140, as shown in FIG. 1. The waveguide outer conductor 110 and the current generator 200 may each be connected to ground, and are electrically connected together.

FIG. 2 depicts a logic circuit diagram of the multiple phase-shifted sinewave current generator 200, which includes a power supply 236, a main signal generator 234 and a plurality of phase shifters 230. The multiple phase-shifted sinewave current generator 200 may be configured to operate at a single frequency at a time and has multiple phase-shifted sinewave current outputs labeled as A, B, C . . . L, which correspond in number to the plurality of phase shifters 230 that match the number of the sub-antennas 130 in one cycle. These current outputs connect and input the sinewave current to the tailored antenna 120 on each sub-antennas 130 through the respective feed lines 140. The outputs of the sinewave current generator 200 may each have the same amplitude, but the outputs have phase-shifted sequences such as A, B, C, . . . L. In this embodiment, the intervals of phase-shift on all input sinewave currents are the same, such as 30° for twelve sub-antennas in one cycle as illustrated in the depicted embodiment, 120° for an antenna having three sub-antennas in one cycle, etc. The smaller the interval of phase-shift is, the better the tailored EM wave 160. The power supply 236 supplies power to the main signal generator 234 with a selected single frequency at a time. The main signal generator 234 provides an oscillating sinewave current to all phase shifters 230 which sequentially shift a phase of the sinewave currents at equal intervals 232 between adjacent sinewave currents in one cycle. The current outputs of the current generator 200 are labeled A, B, C . . . L.

The sinewave current generator 200 only determines the frequency of the current, not an effective wavelength 162 of the tailored EM wave originated/generated in the coaxial waveguide. Therefore the coaxial waveguide 100 must pair with the current generator 200 to create the tailored EM wave at desired effective velocity 122 of the tailored EM wave 160.

According to an important aspect of the present invention, the multiple phase-shifted sinewave current generator 200 is configured so that it respectively inputs, at single frequency at a time, a phase-shifted sequence of sinewave currents to the sub-antennas 130 of the tailored antenna 120 through the feed lines 140 associated with the sub-antennas. In the depicted embodiment, the phase-shifted sequence involves twelve (12) inputs A, B, C . . . L on the sub-antennas 130 of the tailored emitting antenna 12.

When the sub-antennas 130 receive the sinewave currents in phase-shifted sequences, the tailored antenna 120, consisting of the multiple sub-antennas 130, collectively originates and forms the tailored EM wave 160 within the coaxial waveguide 100. The internal space of the waveguide 100 may be vacuum 112, in which case the traveling or propagating speed of the tailored EM wave 160 is its effective velocity 122. A physical distance on the tailored antenna 120 between two of the sub-antennas 130 with same phase shift defines or determines an effective wavelength 162 of the tailored EM wave 160. The effective wavelength 162 is advantageously selectable by design of the tailored antenna 120 and is independent to the frequency and the effective velocity 122 of the tailored EM wave 160. The length of the waveguide 100 should be at least twice as long as the effective wavelength 162 to minimize harmonic frequencies. In the depicted embodiment the tailored antenna 120 including twenty five sub-antennas 130 is more than twice as long as the effective wavelength 162. Each of the sub-antenna 130 has some electrical resistance, and such resistance permits and builds up voltage potential difference between adjacent sub-antennas, but the electrical resistance should be in limited range. If too little electrical resistance were between the adjacent sub-antennas, adjacent phase-shifted currents could be distorted, whereas if too much electrical resistance were between the adjacent sub-antennas, the current flow of the tailored EM wave could be limited.

The tailored EM wave 160 exists in near field within the coaxial waveguide 100 configuration similar to a common coaxial cable. The coaxial waveguide 100 includes the tailored antenna 120 which is disposed along the waveguide's center axis and carries alternating sinewave current of the originated/generated, tailored EM wave 160 from the beginning point 124 to the ending point 126 of the antenna, where an end load 170 with matched impedance is connected and may be matched with impedance. The tailored antenna is constructed physically and electrically by multiple sub-antennas in series, where each of the sub-antennas produces a section of the tailored EM wave. An electric field is generated radially towards and perpendicular to the outer conductor 110 of the waveguide and a magnetic field is generated circularly around and perpendicular to the tailored antenna 120 by the alternating sinewave current on the tailored antenna 120. This results from the tailored EM wave 160 that propagates within the waveguide 100 towards the end load 170. Because the direction of propagation vector, or Poynting vector, of the EM wave 160 is always orthogonal to both electric field and magnetic field, the direction of propagation is in the axial direction of the waveguide. Therefore, the present invention is advantageously different from the Background Art discussed above because there is no directional EM energy loss in the tailored EM wave 160 inside the waveguide 100. Also, because the internal space of the coaxial waveguide 100 in the depicted embodiment is vacuum 112, the present invention is advantageously different from the Background Art discussed above because no dielectric EM energy loss occurs in vacuum. The tailored EM wave 160 cannot exist outside the waveguide 100 in free space 180.

The present invention uniquely, efficiently generates or originates tailored EM waves 160 having lower velocities than the speed of EM waves wave in free space. In other words, the present invention efficiently originates or generates a relatively slow EM wave. As discussed above, the efficiency results because there is no directional EM energy loss in the tailored EM wave 160 which axially propagates within the coaxial waveguide 100, and because there is no dielectric EM energy loss due to use of vacuum as the dielectric medium within the coaxial waveguide 100 according to the embodiment of the present invention, rather than denser dielectric materials which are conventionally used to slow the velocity of an electromagnetic wave. Just as an EM wave passing through a dielectric medium within a conventional waveguide has slower phase velocity than the speed of light (c) in free space, the effective velocity ($v_e$) 122 of the propagating tailored EM wave 160 in vacuum 112 within the coaxial waveguide 100 of the present embodiment is the frequency (f) times the effective wavelength ($\lambda_e$). That is, $v_e = f \cdot \lambda_e$ and may be much smaller than the speed of light (c) in free space. Common use of a dielectric medium that is denser than vacuum or even metamaterial dielectric medium to slow down the velocity of EM wave inside a waveguide will typically consume some of the energy of the EM wave. In contrast, the present embodiment uses vacuum as the dielectric medium within the waveguide 100 because vacuum as the dielectric medium doesn't consume energy of EM wave.

The tailored EM wave generated using the system and method of the present invention has an effective phase velocity 122 which may be designed several orders of magnitude smaller than the speed of light (c) in free space, e.g., 10 to 100,000 times slower. As an example when the vacuum 112 in the waveguide is maintained, if the frequency of the multiple phase-shafted sinewave current generator 200 sets f=30 KHz and the effective wavelength of the coaxial waveguide 100 sets $\lambda_e$=1 m, the effective velocity 122 would be $$v_e = f \cdot \lambda_e = 30000 \times 1 = 3 \times 10^4 \text{ m/s}$$

By comparison to an EM wave in free space which travels at the speed of light c, this would be $$c(\text{speed of light})/v_e = 3 \times 10^8 / 3 \times 10^4 = 10000$$

Hence, the effective phase velocity 122 ($v_e$) of the tailored EM wave in this example is 10,000 times slower than the speed of light.

The coaxial waveguide 100 according to the above discussed embodiment may be modified in various ways. For example, the tailored antenna 120 need not be constructed of multiple sub-antennas 130 joined sequentially together in a linear arrangement. According to a possible modification to the above discussed embodiment, the tailored antenna 120 can also be constructed by a continuously long straight rod made of the second conductor, which is a relatively low conductive material, like chromium, titanium, on which the feed lines are physically and electrically connected in sequence with equal segment lengths between the adjacent feed lines. Each segment of the continuously long straight rod is effectively a sub-antenna so that the tailored antenna 120 according to this modification would still be effectively constructed by multiple phase-shifted sub-antennas connected in series. Also, the interior space of the coaxial waveguide 100 is in vacuum for minimizing energy loss. However, any dielectric medium other than vacuum may be used to fill the interior space within the coaxial waveguide 100 according to the present invention, but this would result in some dielectric energy loss.

Second Illustrative Embodiment

Figure 3:
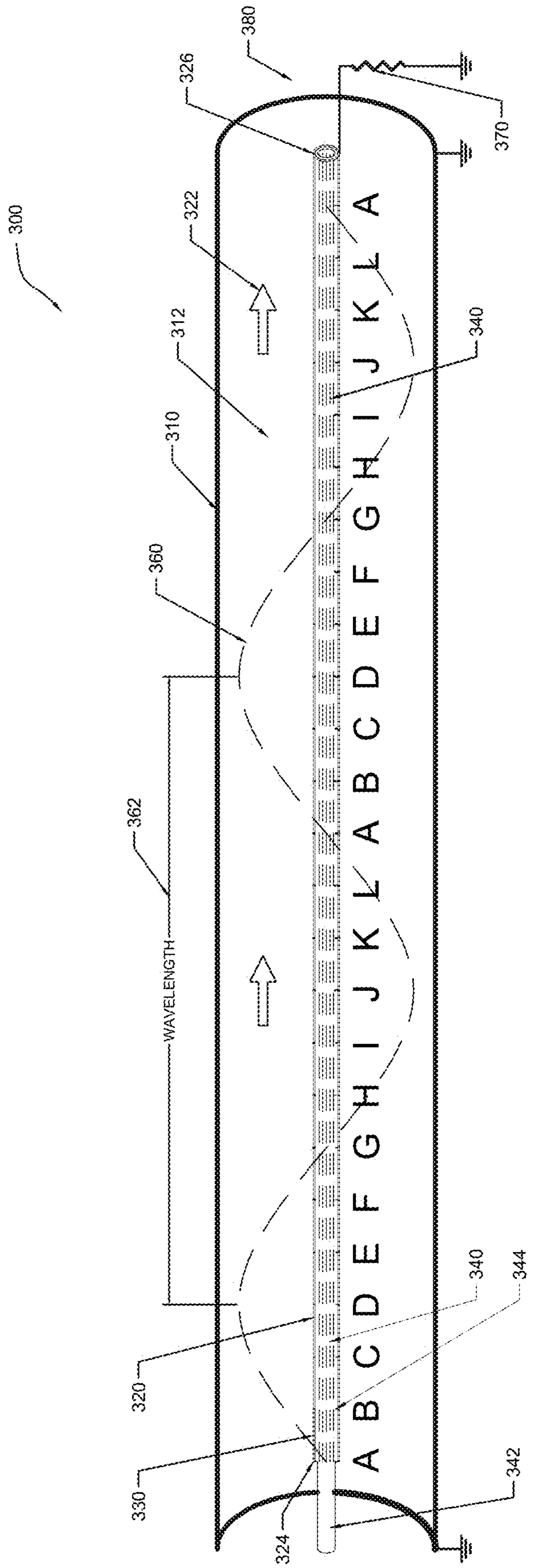
FIG. 3 is a side, sectional view of another exemplary embodiment of a coaxial waveguide according to the present invention and a tailored electromagnetic (EM) wave within the waveguide.

Referring to FIG. 3 there is shown a coaxial waveguide 300 according to a second illustrative embodiment of the present invention. Primary differences between this second embodiment and the first embodiment discussed above pertain to the hollowed structure of a tailored emitting antenna 320 and feed lines 344 that provide multiple phase-shifted sinewave current outputs to sub-antennas 330 of the tailored emitting antenna 320.

FIG. 3 is a side, sectional view of the coaxial waveguide 300 according to the second embodiment of the present invention, wherein a tailored EM wave 360 that originates within the waveguide 300 is shown in broken lines. The coaxial waveguide 300 includes many features which are common to the coaxial waveguide 100 of the first embodiment, including that: internal space of the waveguide may be vacuum 312; outside the waveguide 300 is free space 380; an outer circumference conductor 310 of the waveguide 300 is the first conductor, which is made of highly conductive material like copper, aluminum, etc., in shape of a round tube, square tube, etc.; a tailored emitting antenna 320 is in the shape of a long straight hollowed rod functioning as a center conductor of the coaxial waveguide 300 and is constructed electrically and mechanically by at least three, phase-shifted sub-antennas 330 in series; the antenna 320 as illustrated includes twelve sub-antennas 330 in one cycle; all of the sub-antennas 330 are identical in shape and made of the second conductor, which is a relatively low conductive material like chromium, titanium, so that each sub-antenna 330 can have voltage potential difference due to some electrical resistance of the material; all sub-antennas 330 are physically and electrically connected in series collectively forming a long straight hollowed rod as the tailored antenna 120 that can carry electric current through from a beginning point 324 of the antenna to an ending point 326 of the antenna where an end load 370 is connected.

The tailored emitting antenna 320 is different from the tailored emitting antenna 120 of the first embodiment in the following respects. First, the antenna 320 is hollow and each of the sub-antennas 330 forming the antenna is of a short piece of straight hollowed rod. Second, feed lines 340, which respectively provide phase-shifted sinewave current outputs from a multiple phase-shifted sinewave current generator such as the generator 200 in FIG. 2, are bundled together 342 and are disposed inside the hollow tailored antenna 320. The bundled feed lines 342 may enter the hollow antenna 320 from one end of the antenna nearest to a beginning point 324 of the antenna, rather than through a side wall of the waveguide as in the first embodiment, and then extend through the hollow antenna to the ending point 326 of the antenna so that electric field together sums zero inside the linear, hollow tailored antenna 320. Inside the hollow antenna each of the centrally disposed feed lines 340 branches out as 344 and respective, electrically connect to the sub-antenna 330 by phase-shift sequence A, B, C . . . L, similar to the respective connections of the side feed lines 140 to the phase shifted sub-antennas 130 in the first embodiment. The grounded outer conductor 310 and the grounded current generator 200 are connected together just as the grounded outer conductor 110 is connected to the grounded current generator 200 in the first embodiment.

As a modification to the second embodiment, the tailored emitting antenna 320 may alternatively be constructed by a continuously long straight hollowed rod made of the second conductor, which is a relatively low conductive material like chromium, titanium, etc., on which feed lines providing phase-shifted sinewave current outputs from the generator 200, such as the feed lines 340, are physically and electrically connected in sequence with equal length/size segments of the continuously long straight hollowed rod antenna between the adjacent feed lines. Each segment of the continuously long straight hollowed rod antenna is effectively a sub-antenna so that the tailored antenna 320 is still effectively constructed by multiple phase-shifted sub-antennas connected in series.

An effective wavelength 362 is defined and calculated as same as that of the effective wavelength 162 in FIG. 1. An effective velocity 322 is defined and calculated as same as that of the effective velocity of 122 in FIG. 1.

Third Illustrative Embodiment

Figure 4:
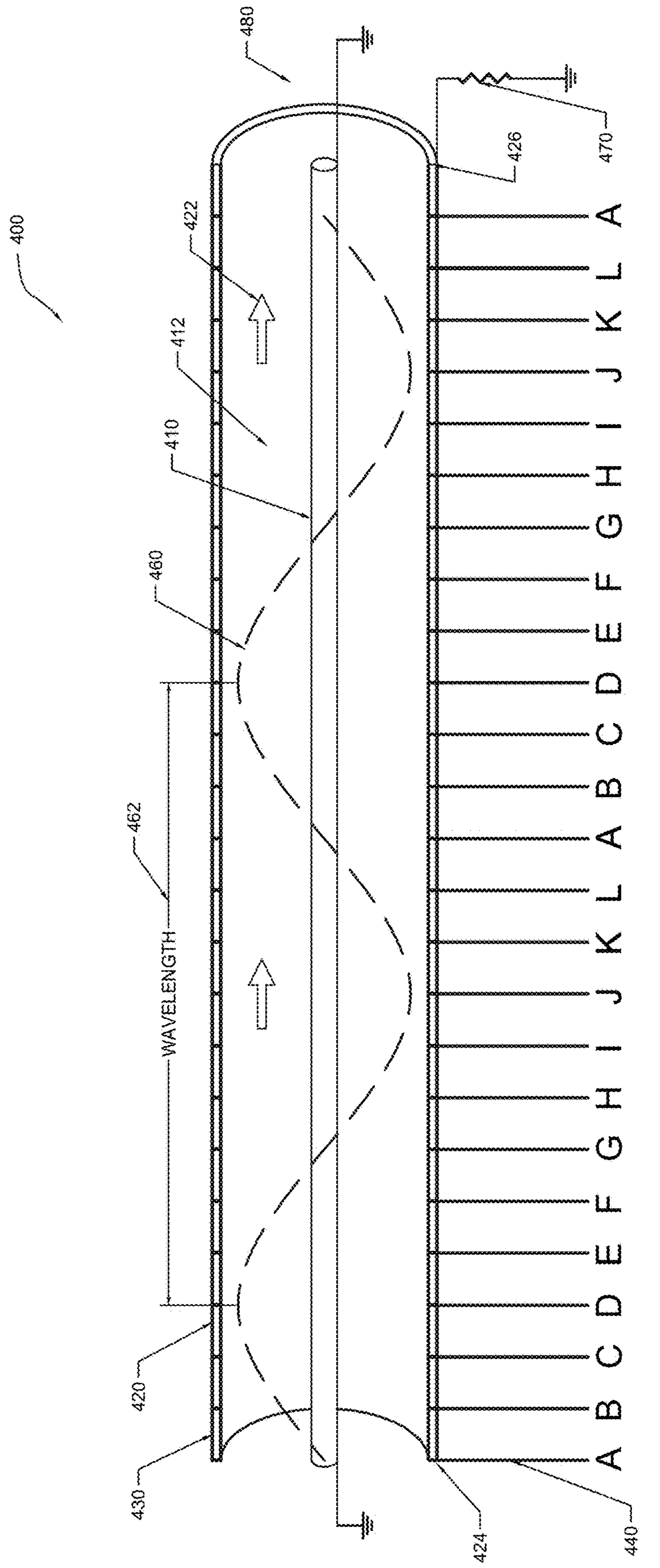
FIG. 4 is a side, sectional view of still another exemplary embodiment of a coaxial waveguide according to the present invention and a tailored electromagnetic (EM) wave within the waveguide.

Referring to FIG. 4 there is shown a coaxial waveguide 400 according to a third illustrative embodiment of the present invention. Primary differences between this third embodiment and the first embodiment discussed above pertain to the structure of a tailored emitting antenna 420 and a conductor 410 of the coaxial waveguide. Essentially, the positioning of the antenna 420 and the conductor 410 are reversed in comparison the tailored emitting antenna 120 and conductor 110 of the coaxial waveguide 100 of the first embodiment. In the third embodiment the tailored emitting antenna 420 forms the outer circumferential portion of the waveguide 400 and the conductor 410 forms an internal portion of the waveguide 400 extending linearly along a central axis of the waveguide 400, which is reverse to the internal positioning of the antenna 120 and the outer positioning of the conductor 110 in the coaxial waveguide 100.

FIG. 4 is a side, sectional view of the coaxial waveguide 400 according to the third embodiment of the present invention, wherein a tailored EM wave 460 that originates within the waveguide 400 is shown in broken lines. The coaxial waveguide 400 includes many features which are common to the coaxial waveguide 100 of the first embodiment, including that: internal space of the waveguide 400 may be vacuum 412; outside the waveguide 400 is free space 480; the conductor 410 of the waveguide 400 is made of the first conductor, which is a highly conductive material, like copper, aluminum, etc.; the tailored emitting antenna 420 is elongate, tubular and is constructed electrically and physically by at least three, phase-shifted sub-antennas 430 in series; the illustrated embodiment includes twelve sub-antennas 430 in one cycle; all of the sub-antennas 430 are identical and made of the second conductor, which is a relatively low conductive material like chromium, titanium, etc., so that each sub-antenna 430 can have voltage potential difference due to some electrical resistance of the material; all of the sub-antennas 430 are physically and electrically connected in series collectively an elongate tubular member as the tailored antenna 420 that can carry electric current through from a beginning point 424 to an ending point 426 where an end load 470 is connected; and all of the sub-antennas 430 are electrically connected by side feed lines 440 to a multiple phase-shifted sinewave current generator such as the generator 200 in FIG. 2.

The tailored emitting antenna 420 is different from the tailored emitting antenna 120 of the first embodiment in the following respects. First, the antenna 420 is hollow and each of the sub-antennas 430 forming the antenna is of a short piece of the straight outer circumference of the coaxial waveguide 400. Second, the conductor 410 is a solid rod extending along the central axis of the waveguide.

As a modification to the third embodiment, the tailored antenna 420 may alternatively be constructed by a continuously long straight tube made of the second conductor, which is a relatively low conductive material like chromium, titanium, etc., on which the side feed lines 440 are physically and electrically connected in sequence with equal size/length segments of the antenna 420 between the adjacent feed lines. Each segment of the continuously long straight tube is effectively a sub-antenna so that the tailored antenna 420 is still effectively constructed by multiple phase-shifted sub-antennas connected in series. The grounded center conductor 410 and the grounded current generator 200 are all connected together just as the grounded outer conductor 110 is connected to the grounded current generator 200 in the first embodiment.

An effective wavelength 462 is defined and calculated the same as that of the effective wavelength 162 in FIG. 1. An effective velocity 422 is defined and calculated as same as that of the effective velocity of 122 in FIG. 1.

As will be understood by a skilled artisan, all embodiments and descriptions of the present invention may be applied on to miniature physical sizes like Micro-Electro-Mechanical System (MEMS) or even made on to semiconductor chips.

The present invention is not limited in its application to the details of construction and to the dispositions of the components set forth in the foregoing description or illustrated in the appended drawings in association with the present illustrative embodiments of the invention. The present invention is capable of being structured in other embodiments and of being practiced and carried out in various ways. In addition, it is to be understood that the phraseology and terminology employed herein are for the purposes of illustration and example, and should not be regarded as limiting. As such, those skilled in the art will appreciate that the concepts, upon which this disclosure is based, may readily be utilized as a basis for the designing of other structures, methods and systems for carrying out the several purposes of the present invention. It is important, therefore, that the scope of the claims appended hereto be regarded-interpreted as including such equivalent constructions.

I claim:

1. A system for efficiently generating or originating a tailored electromagnetic (EM) wave having a lower velocity than the speed of electromagnetic waves in free space, comprising:

a coaxial waveguide which extends linearly; and a sinewave current generator, wherein the coaxial waveguide includes a tubular outer body and a tailored emitting antenna disposed coaxially within the tubular outer body, the tubular outer body is formed of a first conductive material and defines a space, the tailored emitting antenna is constructed physically and electrically by at least three phase-shifted sub-antennas connected in series, each of the sub-antennas being formed of a second conductive material which is less conductive than the first conductive material, and the sinewave current generator generates multiple phase-shifted sinewave currents which are respectively input to the sub-antennas.

2. The system according to claim 1, wherein the coaxial waveguide and the sinewave current generator are configured such that when the sub-antennas receive the sinewave currents in phase-shifted sequences from the sinewave current generator, the tailored emitting antenna originates and forms the tailored EM wave having the lower velocity than the speed of electromagnetic waves in free space.

3. The system according to claim 2, wherein the tailored EM wave having the lower velocity than the speed of electromagnetic waves in free space propagates along the tailored emitting antenna.

4. The system according to claim 2, wherein the tailored EM wave having the lower velocity than the speed of electromagnetic waves in free space has an effective wavelength that is equal to the physical distance between two of the sub-antennas having a same phase-shift of the phase-shifted sinewave currents.

5. The system according to claim 4, wherein a longitudinal length of the coaxial waveguide is at least as long as the effective wavelength of the tailored EM wave.

6. The system according to claim 1, further comprising an end load which is connected to the tailored emitting antenna.

7. The system according to claim 1, wherein the multiple phase-shifted sinewave currents have a same amplitude and same interval between adjacent sinewave currents at a selected single frequency.

8. The system according to claim 1, wherein the phase-shifted sub-antennas are identical to each other.

9. The system according to claim 1, wherein the sinewave current generator inputs the multiple phase-shifted sinewave currents to the sub-antennas through a side wall of the tubular outer body of the coaxial waveguide.

10. The system according to claim 1, wherein the tailored emitting antenna is hollow and the sinewave current generator inputs the multiple phase-shifted sinewave currents to the sub-antennas through a hollow space of the tailored emitting antenna.

11. The system according to claim 1, wherein the waveguide defines a space which is maintained in vacuum.

12. The system according to claim 1, wherein the waveguide defines a space which is not vacuum.

13. The system according to claim 1, wherein the tubular outer body of the coaxial waveguide has a round cross-sectional shape.

14. The system according to claim 1, wherein the tubular outer body of the coaxial waveguide has a square cross-sectional shape.

15. The system according to claim 1, wherein the tubular outer body of the coaxial waveguide has a rectangular cross-sectional shape.

16. The system according to claim 1, wherein the sinewave current generator generates multiple sinewave currents with same frequency and amplitude, but different phase-shift.

17. The system according to claim 1, wherein a frequency of the tailored EM wave is determined by the sinewave current generator, and a wavelength of the tailored EM wave is determined by the tailored emitting antenna.

18. A system for efficiently generating or originating a tailored electromagnetic (EM) wave having a lower velocity than the speed of electromagnetic waves in free space, comprising:

a coaxial waveguide which extends linearly; and a sinewave current generator, wherein the coaxial waveguide includes a tubular outer body formed of a second conductive material and defines a space, and an internal conductor disposed coaxially within the space of the tubular outer body and is formed of a first conductive material which is more conductive than the second conductive material, the tubular outer body functions as a tailored emitting antenna and is constructed physically and electrically by at least three phase-shifted sub-antennas connected in series, and the sinewave current generator generates multiple phase-shifted sinewave currents which are respectively input to the sub-antennas.

19. A system for efficiently generating or originating a tailored electromagnetic (EM) wave having a lower velocity than the speed of electromagnetic waves in free space, comprising:

a coaxial waveguide which extends linearly;

a tailored emitting antenna which is constructed physically and electrically by at least three phase-shifted sub-antennas connected in series; and a sinewave current generator which generates multiple phase-shifted sinewave currents which are respectively input to the sub-antennas, wherein each of the sub-antennas produces a section of the tailored EM wave inside the waveguide.

* * * * *